United States Patent

Gallagher

(10) Patent No.: US 9,903,432 B2
(45) Date of Patent: Feb. 27, 2018

(54) HEAT SHIELDS AND BRAKE CALIPERS INCLUDING ONE OR MORE HEAT SHIELDS

(71) Applicant: SRAM, LLC, Chicago, IL (US)

(72) Inventor: Paul D. Gallagher, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 60 days.

(21) Appl. No.: 14/793,796

(22) Filed: Jul. 8, 2015

(65) Prior Publication Data

US 2017/0009833 A1    Jan. 12, 2017

(51) Int. Cl.
| | |
|---|---|
| *F16D 65/78* | (2006.01) |
| *B62L 1/00* | (2006.01) |
| *B60T 5/00* | (2006.01) |
| *F16D 55/228* | (2006.01) |
| *F16D 65/00* | (2006.01) |
| *F16D 65/092* | (2006.01) |

(52) U.S. Cl.
CPC ............... *F16D 65/78* (2013.01); *B60T 5/00* (2013.01); *B62L 1/00* (2013.01); *F16D 55/228* (2013.01); *F16D 65/0068* (2013.01); *F16D 65/092* (2013.01); *F16D 2065/785* (2013.01)

(58) Field of Classification Search
CPC .... F16D 65/78; F16D 65/0068; F16D 65/092; F16D 2065/785; F16D 55/228; B62L 1/00; B60T 5/00

USPC ...... 188/71.6, 264 AA, 264 G, 264 R, 264 A
See application file for complete search history.

(56) References Cited

U.S. PATENT DOCUMENTS

| | | | | |
|---|---|---|---|---|
| 4,305,484 | A | * 12/1981 | Bradley | ............ F16D 65/0979 188/73.32 |
| 4,527,672 | A | * 7/1985 | Schreiner | ............... F16D 65/18 188/264 G |
| 4,583,623 | A |   4/1986 | Ritsema | |
| 5,445,242 | A | * 8/1995 | Pogorzelski | .......... F16D 55/228 188/264 CC |
| 5,660,253 | A |   8/1997 | Rike | |
| 2010/0170755 | A1 |   7/2010 | Biggs | |
| 2012/0152610 | A1 | * 6/2012 | Keahey | .................. F16D 65/78 174/548 |

FOREIGN PATENT DOCUMENTS

JP    2015110985 A * 6/2015

OTHER PUBLICATIONS

Import Car Parts Subaru Imprezza; available at: http://importcarparts.co.uk.
Subaru Imprezza Forum; available at: http://www.rs25.com.

* cited by examiner

*Primary Examiner* — Pamela Rodriguez

(57) ABSTRACT

A brake caliper may include a housing having a cavity. The brake caliper also includes a brake pad and a heat shield disposed in the cavity. The heat shield may be positioned substantially orthogonal to the brake rotor and include a slot to receive a portion of a brake rotor.

7 Claims, 10 Drawing Sheets

HEAT SHIELDS AND BRAKE CALIPERS INCLUDING ONE OR MORE HEAT SHIELDS

BACKGROUND OF THE INVENTION

A traditional bicycle may include a hydraulic brake system employing a brake rotor and a brake caliper with brake pads. Typically, the brake pads engage the brake rotor to generate a braking force. However, when the brake pads engage the brake rotor, friction between the brake pads and the brake rotor generates heat, which is transferred to the brake caliper. As a result, the heat may damage the brake caliper and/or boil brake fluid employed by the hydraulic brake system. Conventional heat shields, or backing plates, are oriented in association with the brake pads, parallel or planar to the calipers, to shield from the generated heat. This configuration may allow for heat to be transferred to other locations of the calipers in some applications.

SUMMARY

According to one aspect, a heat shield for a brake caliper includes a first portion, a second portion spaced apart from the first portion, and a third portion extending between the first portion and the second portion. The heat shield is configured to dispose the first portion and the second portion on opposing sides of a brake rotor.

According to another aspect, a brake caliper includes a housing having a cavity configured to receive a brake pad. The brake caliper also includes a heat shield disposed in the cavity, the heat shield including a slot to receive a portion of a brake rotor.

According to a different aspect, a brake caliper includes a cavity and a brake pad disposed in the cavity, the brake pad configured to apply braking force to a rotor. The brake caliper also includes a heat shield positioned in the cavity adjacent and forward of the brake pad in a direction of rotation of the brake rotor.

BRIEF DESCRIPTION OF THE DRAWINGS

Other aspects and advantages of the embodiments disclosed herein will become apparent upon consideration of the following detailed description, wherein similar or identical structures have similar or identical reference numerals.

DETAILED DESCRIPTION

Heat shields and brake calipers including one or more heat shields are disclosed herein. The heat shields may be oriented in a non-parallel or planar orientation relative to a brake rotor, and positioned to shield particular areas of the brake calipers. For example, heat shields may be oriented substantially perpendicular or orthogonal to the rotor, and/or positioned following the brake pads relative to a primary direction of rotation of the rotors. Also, the heat shields may be configured with legs to be positioned on opposing sides of the rotor. Therefore, the heat shield may be configured and particularly positioned to protect the calipers from heat generated during actuation or engagement of brake pads with a brake rotor, as is described in more detail below.

Figure 1:
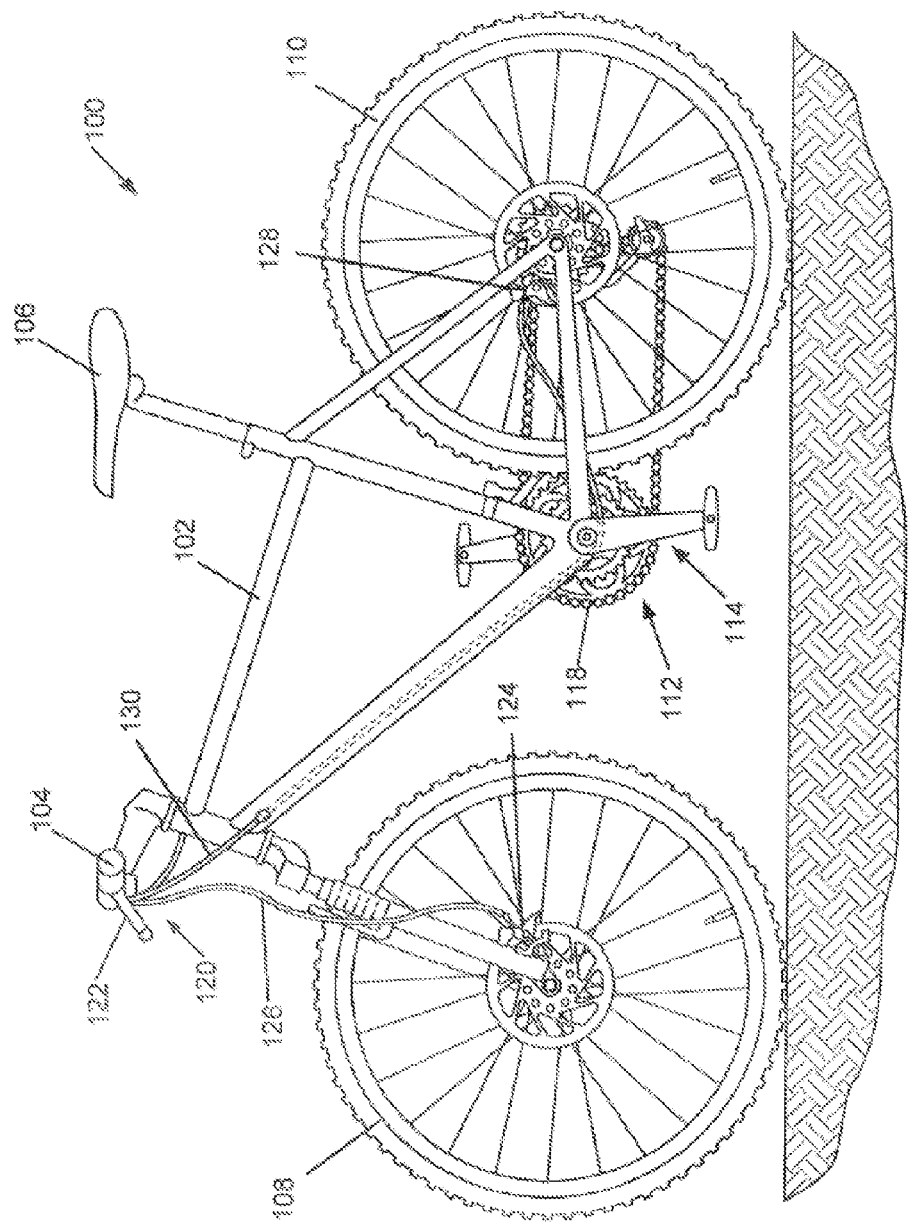
FIG. 1 is a side elevational view of a bicycle, which may be used to employ a brake caliper having one or more heat shields in accordance with the teachings of this disclosure.

FIG. 1 illustrates an example bicycle 100, which may be used to implement the heat shields and the brake calipers disclosed herein. In the illustrated embodiment, the bicycle 100 includes a frame 102, handlebars 104, and a seat 106. The bicycle 100 also includes a first or front wheel 108 and a second or rear wheel 110. The bicycle 100 includes a drive train 112. The drive train 112 of FIG. 1 includes a crank assembly 114 operatively coupled to a rear cassette (not shown) via a chain 118. While the illustrated bicycle 100 is a mountain bicycle, the embodiments disclosed herein may be implemented with other types of bicycles such as, for example, road bicycles, as well as bicycles with mechanical (e.g., cable, hydraulic, pneumatic, etc.) and non-mechanical (e.g., wired, wireless) drive systems.

The bicycle 100 of FIG. 1 includes a hydraulic brake system 120. In the illustrated embodiment, the hydraulic brake system 120 includes a first brake lever assembly 122 and a second brake lever assembly (not shown). The first brake lever assembly 122 and the second brake lever assembly are disposed on the handlebars 104. The first brake lever assembly 122 is hydraulically coupled to a first brake caliper 124 via a first brake line 126. In the illustrated embodiment, the first brake caliper 124 is operatively coupled to the front wheel 108. The second brake lever assembly is operatively coupled to a second brake caliper 128 via a second brake line 130. The second brake caliper 128 is operatively coupled to the rear wheel 110. In other embodiments, the hydraulic brake system 120 includes one or more additional and/or alternative components and/or is configured in other ways.

Figure 2:
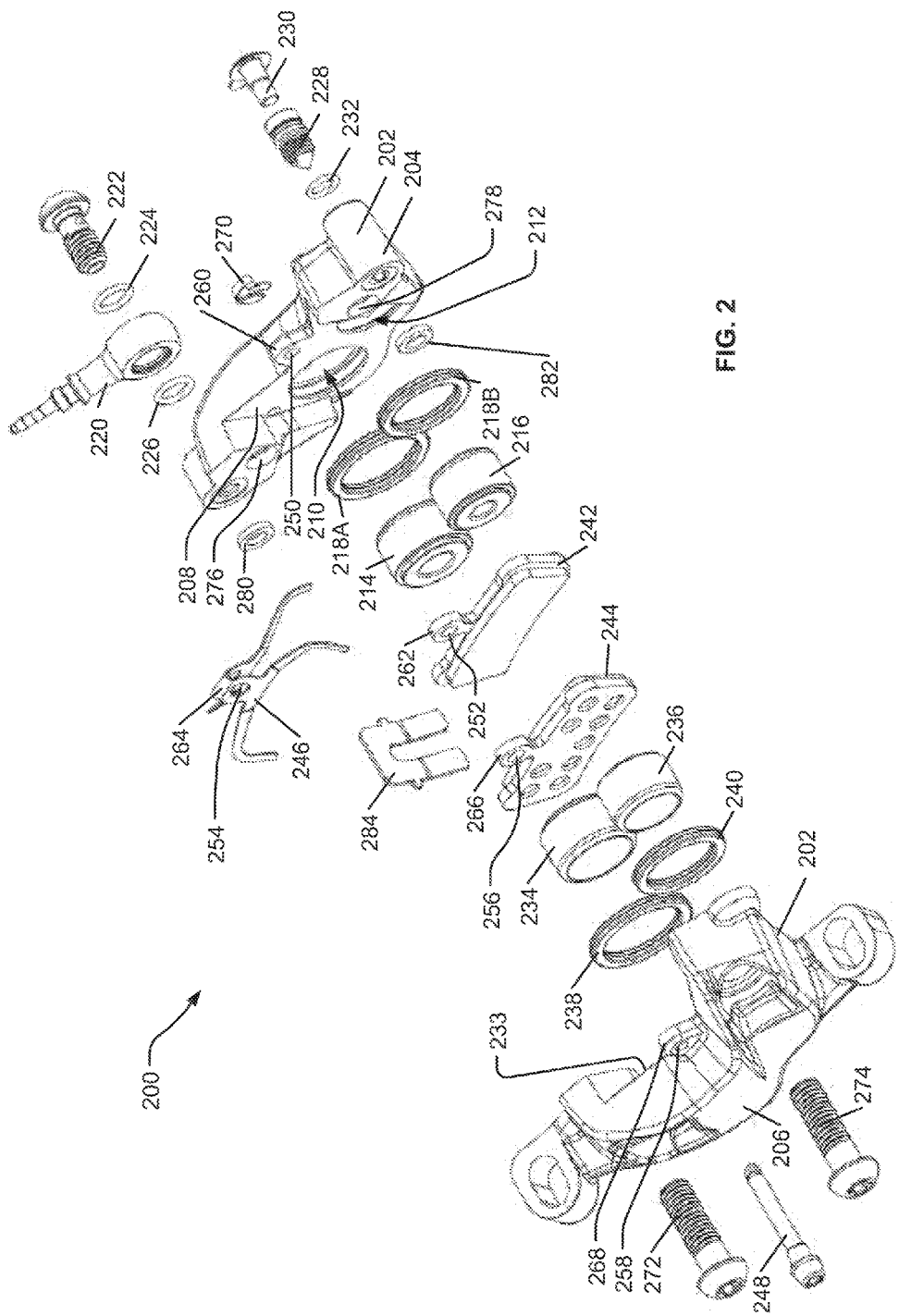
FIG. 2 is an exploded, perspective view of a brake caliper disclosed herein, which may be used to implement the bicycle of FIG. 1.

FIG. 2 is an exploded view of an example brake caliper 200, which may be used to implement the first brake caliper 124 and/or the second brake caliper 128 of FIG. 1. In the illustrated embodiment, the brake caliper 200 includes a housing 202 having a first or inner section 204 and a second or outer section 206. In the illustrated embodiment, the first section 204 of the housing 202 includes a first sidewall 208. The first sidewall 208 includes a first bore 210 and a second bore 212 that receive a first piston 214 and a second piston 216, respectively. A first seal ring 218A is disposed in the first bore 210 and forms a fluid seal between the first section 204 of the housing 202 and the first piston 214. A second seal ring 218B is disposed in the second bore 212 and forms a fluid seal between the first section 204 of the housing 202 and the second piston 216.

The brake caliper 200 of FIG. 2 includes a fitting 220 to receive a brake line (e.g., the first brake line 126, the second brake line 130, etc.) and hydraulically couple a brake lever assembly (e.g., the first brake lever assembly 122) to the brake caliper 200. In the illustrated embodiment, the fitting 220 is coupled to the first section 204 of the housing 202 via a first fastener 222 such as, for example, a banjo bolt. A first O-ring 224 forms a fluid seal between the first fastener 222 and the fitting 220. A second O-ring 226 forms a fluid seal between the fitting 220 and the first section 204 of the housing 202. A bleed valve 228 is coupled to the first section 204 of the housing 202. In the illustrated embodiment, a cap 230 is coupled to the bleed valve 228, and a third O-ring 232 forms a fluid seal between the bleed valve 228 and the first section 204 of the housing 202. The bleed valve 228 enables brake fluid in the caliper 200 to be bled.

The second section 206 of the housing 202 includes a second sidewall 233. The second sidewall 233 includes a third bore (not shown) and a fourth bore (not shown) that receive a third piston 234 and a fourth piston 236, respectively. Although the third bore and the fourth bore are not shown in FIG. 2, the third bore and the fourth bore are substantially similar or identical to the first bore 210 and the second bore 212, respectively. A third seal ring 238 is disposed in the third bore and forms a fluid seal between the second section 206 of the housing 202 and the third piston 234. A fourth seal ring 240 is disposed in the fourth bore and forms a fluid seal between the second section 206 of the housing 202 and the fourth piston 236.

Figure 5:
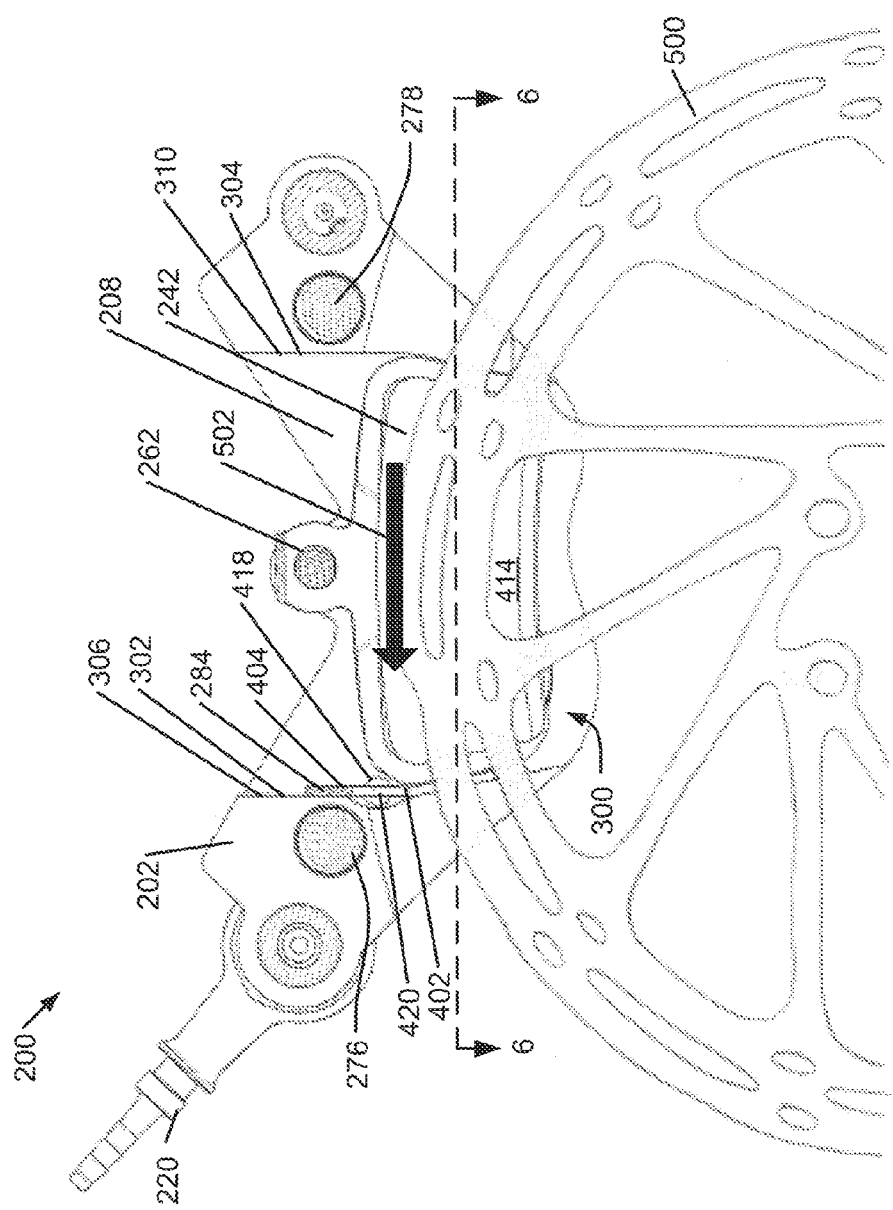
FIG. 5 is a side elevational view of a brake rotor and the heat shield coupled to the section of the housing of the brake caliper of FIG. 4.

In the illustrated embodiment, a first brake pad 242 is operatively coupled to the first piston 214 and the second piston 216. A second brake pad 244 is operatively coupled to the third piston 234 and the fourth piston 236. A spreader 246 is disposed between the first brake pad 242 and the second brake pad 244. The spreader 246 urges the first brake pad 242 and the second brake pad 244 toward the first sidewall 208 and the second sidewall 233, respectively. In the illustrated embodiment, the first brake pad 242, the spreader 246, and the second brake pad 244 are supported on the housing 202 via a pin 248. The pin 248 of FIG. 2 extends through apertures 250, 252, 254, 256, 258 in brackets 260, 262, 264, 266, 268 of the first section 204 of the housing 202, the first brake pad 242, the spreader 246, the second brake pad 244, and the second section 206 of the housing 202, respectively. In some embodiments, the pin 248 guides movement of the first brake pad 242 and the second brake pad 244 when the first brake pad 242 and the second brake pad 244 move into and out of engagement with a disk or brake rotor 500 (FIG. 5). The caliper 200 of FIG. 2 includes a clip 270 to secure the pin 248 to the housing 202.

In the illustrated embodiment, a second fastener 272 (e.g., a bolt) and a third fastener 274 (e.g., a bolt) couple the first section 204 of the housing 202 to the second section 206 of the housing 202. The second section 206 of the housing 202 is in fluid communication with the first section 204 of the housing 202 via a first fluid passageway 276 and a second fluid passageway 278. A first body seal 280 and a second body seal 282 form fluid seals around the first fluid passageway 276 and the second fluid passageway 278, respectively, at interfaces between the first section 204 and the second section 206 of the housing 202.

When a brake lever assembly (e.g., the first brake lever assembly 122) hydraulically coupled to the brake caliper 200 is actuated, brake fluid flows into the first section 204 of the housing 202 via the fitting 220. The brake fluid moves into the first bore 210 and the second bore 212 to move the first piston 214 and the second piston 216 to actuate the first brake pad 242. At substantially the same time, the brake fluid flows into the second section 206 of the housing 202 via the first fluid passageway 276 and/or the second fluid passageway 278 to move the third piston 234 and the fourth piston 236 to actuate the second brake pad 244.

When the first brake pad 242 and the second brake pad 244 contact a brake rotor 500 (FIG. 5), the first brake pad 242 and the second brake pad 244 generate heat. In the illustrated embodiment, the caliper 200 includes a heat shield 284 to reduce an amount of heat transferred from the brake rotor 500 and the brake pads 242, 244 to the housing 202. The heat shield 284 may comprise any suitable material(s) to absorb heat such as, for example, metal (e.g., steel, aluminum, etc.), ceramic, plastic, and/or one or more additional and/or alternative materials. In an embodiment, the heat shield 284 is made of an inox or stainless steel alloy, such as SAE International grades 301, 304, or 316 steel alloys. The heat shield 284 may also be made from a combination of materials. In an embodiment, the heat shield 284 is made of a different material than the housing 202. For example, the housing 202 may be made of aluminum and the heat shield 284 may be made of stainless steel. In an embodiment, the heat shield 284 may be made of the same or similar material as the housing 202. For example, the heat shield 284 and the housing 202 may be made of aluminum. The heat shield 284 may also involve one or more heat dissipation features or structures, such as a fin or an aperture, as is described in more detail below with respect to FIGS. 9 and 10.

As shown, the heat shield 284 is formed as a thin bent plate. The heat shield 284 may also include other shapes and depth dimensions. For example, the heat shield 284 may be a fully flat plat, or have an increased or varying depth across the heat shield. The heat shield 284 may also have rounded edges with consistent or varying depth dimensions.

Figure 3:
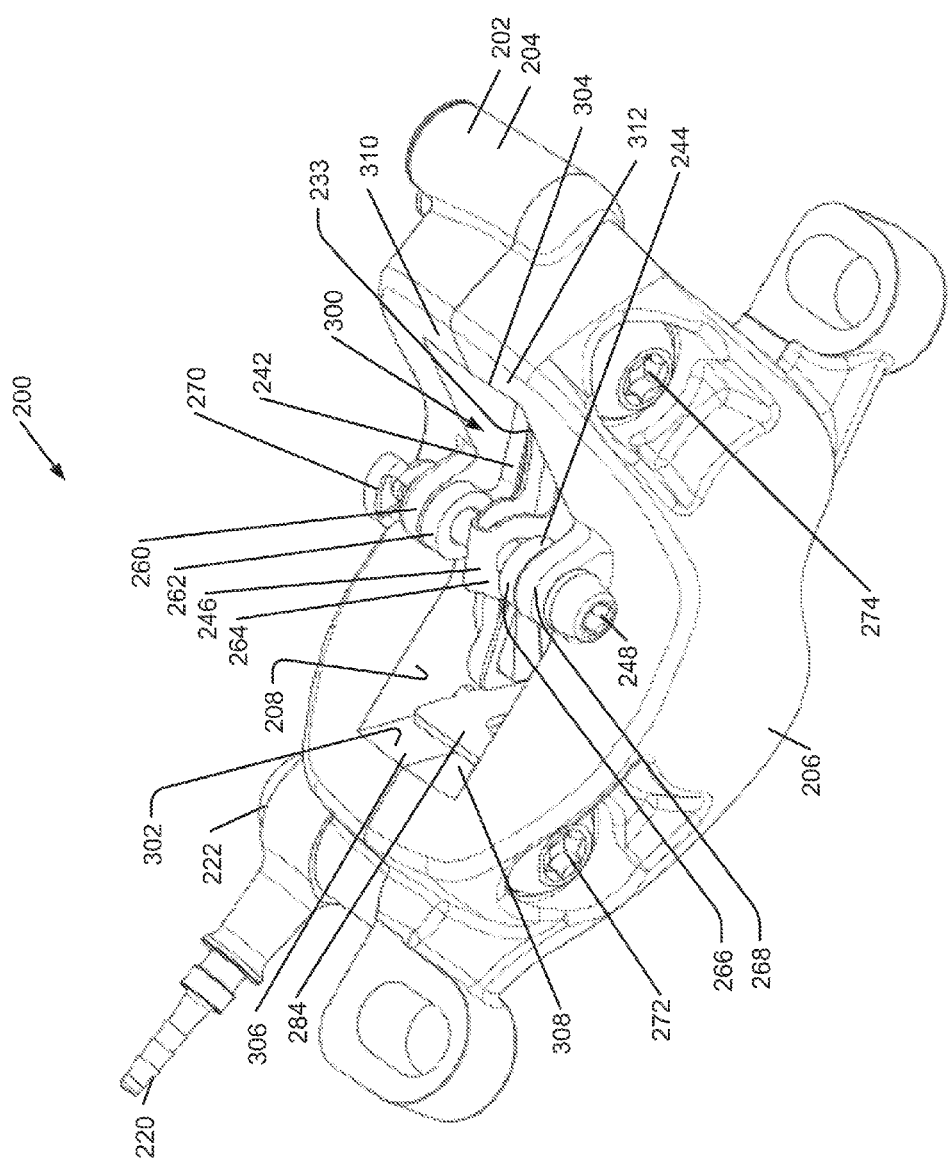
FIG. 3 is a perspective view of the brake caliper of FIG. 2.

FIG. 3 is a top, perspective view of the caliper 200 of FIG. 2. In the illustrated embodiment, the first section 204 and the second section 206 of the housing 202 cooperate to define a cavity 300 between the first section 204 and the second section 206. The cavity 300 of FIG. 3 is defined by the first sidewall 208 and the second sidewall 233 opposing or opposite the first sidewall 208. The cavity 300 is also defined by a first end wall 302 extending between the first sidewall 208 and the second sidewall 233. The cavity 300 is further defined by a second end wall 304 extending between the first sidewall 208 and the second sidewall 233. In the illustrated embodiment, the first end wall 302 is opposing or opposite the second end wall 304. In the illustrated embodiment, a first portion 306 of the first end wall 302 is integral with the first section 204 of the housing 202. A second portion 308 of the first end wall 302 is integral with the second section 206 of the housing. A first portion 310 of the second end wall 304 is integral with the first section 204 of the housing 202. A second portion 312 of the second end wall 304 is integral with the second section 206 of the housing 202. In other embodiments, the cavity 300 is configured in other ways.

In the illustrated embodiment, the heat shield 284 is disposed between the first end wall 302 and the brake pads 242, 244. The heat shield 284 of FIG. 3 is oriented edgeways or sideways relative to the brake pads 242, 244. In some embodiments, the heat shield 284 is disposed on or in contact with the first end wall 302. In some embodiments, the heat shield 284 is spaced apart from the first end wall 302.

Figure 4:
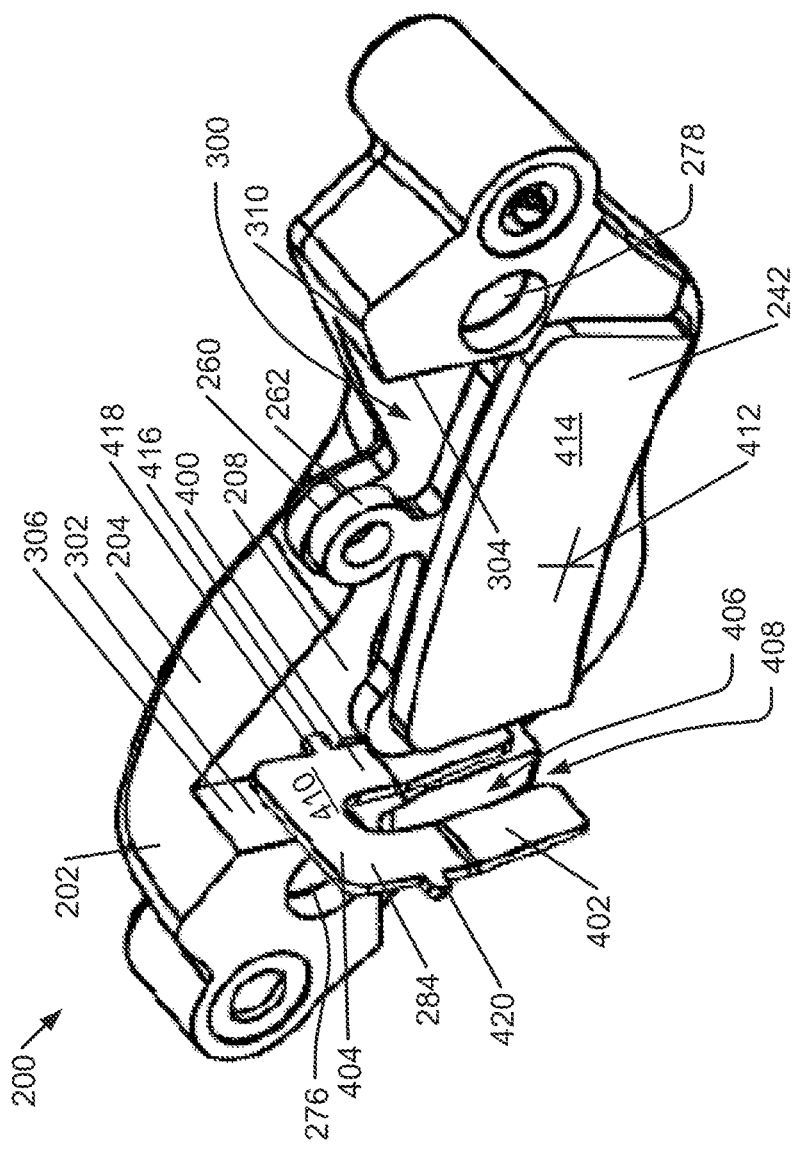
FIG. 4 is a perspective view of a heat shield coupled to a section of a housing of the brake caliper of FIGS. 2 and 3.

FIG. 4 is a perspective view of the caliper 200 of FIGS. 2-4. For illustrative purposes, the second section 206 of the housing 202 is not shown. In the illustrated embodiment, the heat shield 284 includes a first leg 400, a second leg 402, and a bridge 404 extending from the first leg 400 to the second leg 402. In the illustrated embodiment, the first leg 400 is a mirror image of the second leg 402. In other embodiments, the first leg 400 may be a different size and/or shape than the second leg 402. The bridge 404 of FIG. 4 may be a substantially straight, continuous section of the heat shield 284. The bridge 404 may be substantially perpendicular or orthogonal to the first leg 400 and the second leg 402. In other embodiments, the bridge 404 has other configurations. For example, the bridge 404 may be arched, discontinuous, etc. Also, the heat shield may involve a single piece, or multiple pieces. For example, the heat shield may involve separate pieces for each of the legs 400 402 and/or the bridge 404. In an embodiment, a two-piece heat shield is used.

The first leg 400, the second leg 402, and the bridge 404 cooperate to define a slot 406. In the illustrated example, the first leg 400 is spaced apart from the second leg 402 via the slot 406. The heat shield 284 is positioned in the cavity 300 to align the slot 406 of the heat shield 400 with a slot 408 of the housing 202 through which the housing 202 receives a section of a brake rotor 500 (FIG. 5). The slot 406 of the heat shield 284 is dimensioned to receive a portion of the brake rotor 500 and provide clearance between the brake rotor 500 (FIG. 5) and the heat shield 284.

In the illustrated embodiment, the first leg 400 covers an area of the first portion 306 of the first end wall 302, and the second leg 402 covers an area of the second portion 308 of the first end wall 302. The bridge 404 covers an area of the first end wall 302 between the first leg 400 and the second leg 402. As described above with reference to FIG. 3, the heat shield 284 is oriented edgeways or sideways relative to the brake pads 242, 244. Thus, in the illustrated embodiment, a surface 410 (see FIG. 4) of the heat shield 284 facing a center 412 of the cavity 300 is substantially orthogonal to a surface 414 of the first brake pad 242 that engages the brake rotor 500 (FIG. 5). Substantially perpendicular as used herein accounts for variance from a specific angle and allows for a more perpendicular than parallel arrangement. As a result, when the brake pads 242, 244 engage the brake rotor 500 and generate heat, the heat shield 284 absorbs heat via the surface 410 and reduces an amount of heat transferred to the housing 202 via the end wall 302 without the heat shield 284. In some embodiments, the heat shield 284 reduces the amount of heat transferred to the housing 202 such that brake fluid in the housing 202 is about twenty five degrees Celsius cooler than if the housing 202 did not include the heat shield 284 under a given braking condition.

With reference to FIG. 4, the heat shield 284 is coupled to the housing 202. In the illustrated embodiment, the heat shield 284 is coupled to the first sidewall 208 and the second sidewall 233. The heat shield 284 of FIG. 4 includes a first protrusion or peg 416 received in a first receptacle 418 (e.g., a recess, a bore, a catch, etc.) of the first sidewall 208. The first peg 416 projects from the first leg 400 toward the first sidewall 208. The heat shield 284 includes a second protrusion or peg 420 received in a second receptacle (not shown) of the second sidewall 233 (FIGS. 2 and 3). Although the second receptacle is not shown in FIG. 4, the second receptacle is similar or identical to the first receptacle 418. The second peg 420 extends from the second leg 402 toward the second sidewall 233 and, thus, away from the first peg 416. The first peg 416 and the second peg 420 cooperate to secure the heat shield 284 substantially in place and restrain movement of the heat shield 284 relative to the housing 202. In some embodiments, the first peg 416 and the second peg 420 snap fit into the first receptacle 418 and the second receptacle, respectively. In some embodiments, the heat shield 284 is coupled to one or more additional and/or alternative portions of the housing 202 (e.g., the first end wall 302), and/or the heat shield 284 is coupled to the housing 202 in one or more additional and/or alternative ways or with different attachment mechanisms (e.g., via one or more mechanical fasteners such as bolts, screws, welds, brazes, clips, etc.). Also, coupling may involve permanent or removable attachment of the heat shield 284. For example, the heat shield 284 may be integrally formed into the caliper housing, such as with a casting insert.

FIG. 5 is a side view of the brake rotor 500 received in the cavity 300 of the caliper 200. The second section 206 of the housing 202 is not shown for illustrative purposes. In the illustrated embodiment, when the brake pads 242, 244 engage the brake rotor 500 while a bicycle on which the brake caliper 200 is employed is moving forward, the brake pads 242, 244 engage the brake rotor 500 to generate a braking force in response to a direction of rotation of the rotor, which may be in a direction indicated by arrow 502. In some embodiments, more heat is generated during braking in the direction indicated by arrow 502 than in an opposite direction. The heat shield 284 is positioned in the cavity 300 adjacent the brake pads 242, 244 in the direction of the rotation. Thus, in the illustrated embodiment, the heat shield 284 is positioned forward of the brake pads 242, 244 relative to forward movement of the bicycle on which the brake caliper 200 is employed.

Figure 6:
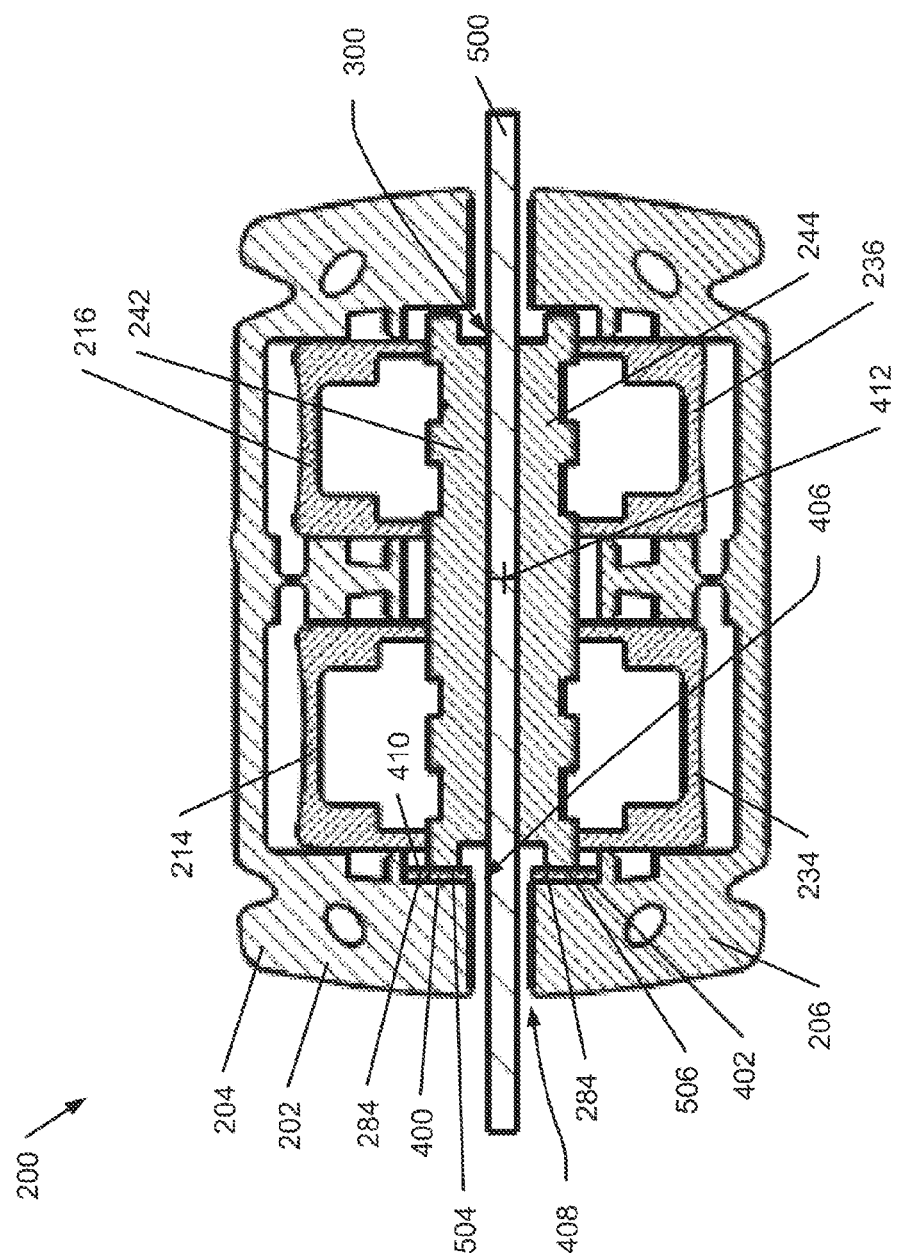
FIG. 6 is a cross-sectional view of the brake caliper and the brake rotor of FIG. 5 taken along line 6-6 of FIG. 5.

FIG. 6 is a cross-sectional view of the caliper 200 of FIGS. 2-5 illustrating the first brake pad 242 and the second brake pad 244 engaging the brake rotor 500. In the illustrated embodiment, a first edge 504 of the first brake pad 242 contacts the surface 410 of the heat shield 284 on the first leg 400. A second edge 506 of the second brake pad 244 contacts the surface 410 on the second leg 402. As a result, in the illustrated embodiment, heat is transferred directly from the first brake pad 242 and the second brake pad 244 to the heat shield 284. In some embodiments, the first brake pad 242 and/or the second brake pad 244 contact the heat shield 284 when the first brake pad 242 and/or the second brake pad 244 are in engagement with the brake rotor 500 and when the first brake pad 242 and/or the second brake pad 244 are out of engagement with the brake rotor 500. In some embodiments, the first brake pad 242 and/or the second brake pad 244 are not in contact with (i.e., are spaced apart from) the heat shield 284 when the first brake pad 242 and the second brake pad 244 are out of engagement with the brake rotor 500. In some such embodiments, the first brake pad 242 and/or the second brake pad 244 are drawn into contact with the heat shield 284 when the first brake pad 242 and/or the second brake pad 244, respectively, engage the brake rotor 500. In other embodiments, the first brake pad 242 and/or the second brake pad 242 do not contact the heat shield 284 when the first brake pad 242 and/or the second brake pad 244 are in engagement or out of engagement with the brake rotor 500.

Figure 7:
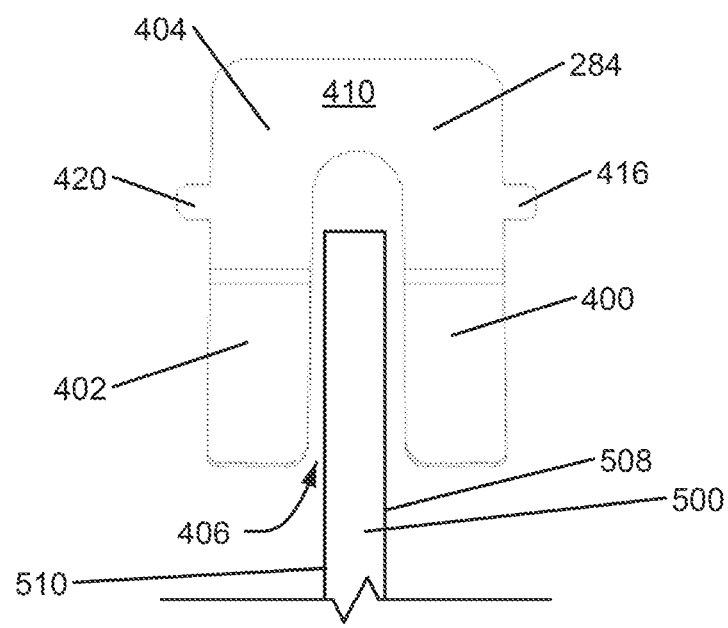
FIG. 7 is a front elevational view of the heat shield of FIGS. 4-6 straddling the brake rotor of FIG. 5.

FIG. 7 is a front view of the heat shield 284 of FIGS. 2-6 straddling the brake rotor 500. In the illustrated embodiment, a portion of the brake rotor 500 is received in the slot 406 of the heat shield 284 such that the first leg 400 is disposed on a first side 508 of the brake rotor 500, and the second leg 402 is disposed on a second side 510 of the brake rotor 502. Thus, the heat shield 284 of FIG. 5 straddles the brake rotor 500.

Figure 8:
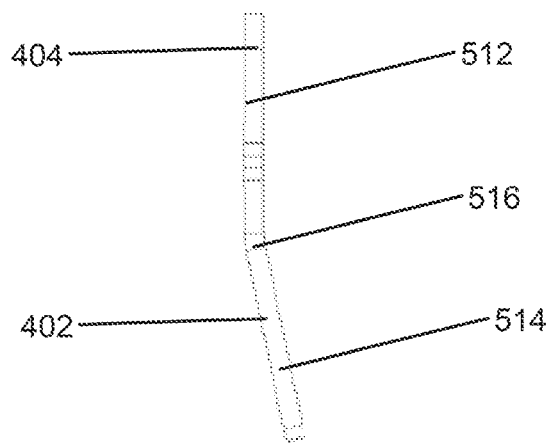
FIG. 8 is a side elevational view of the heat shield of FIGS. 4-7.

FIG. 8 is a side view of the heat shield of FIGS. 2-7. In the illustrated embodiment, the heat shield 284 is a plate including a substantially straight first section 512, a substantially straight second section 514, and a bend 516 interfacing the first section 512 and the second section 514. Thus, the first section 512 is slanted or angled relative to the second section 514. In some embodiments, the first section 512 is slanted or angled relative to the second section 514 to enable some or all of the heat shield 284 to correspond to a shape and/or contour of the first end wall 302 and/or seat against the first end wall 302. In other embodiments, the heat shield 284 is other shapes and/or is configured in other ways.

Figure 9:
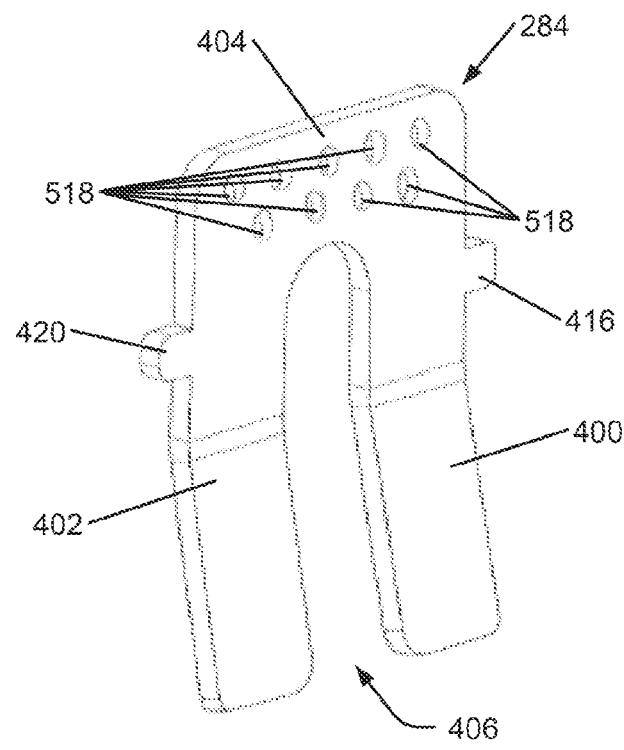
FIG. 9 is a perspective view of the heat shield of FIGS. 4-8 including apertures to dissipate heat.

FIG. 9 is a perspective view of the heat shield 284 employing a heat dissipation structure. The heat dissipation structure includes a plurality of apertures 518 to dissipate heat absorbed by the heat shield 284. In the illustrated embodiment, the apertures 518 extend through the bridge 404. In other embodiments, the apertures 518 may extend through other portions of the heat shield 284. In the illustrated embodiment, the apertures 518 are circular. However, the above-noted shape of the apertures 518 is merely an example and, thus, other shapes may be employed in other embodiments.

Figure 10:
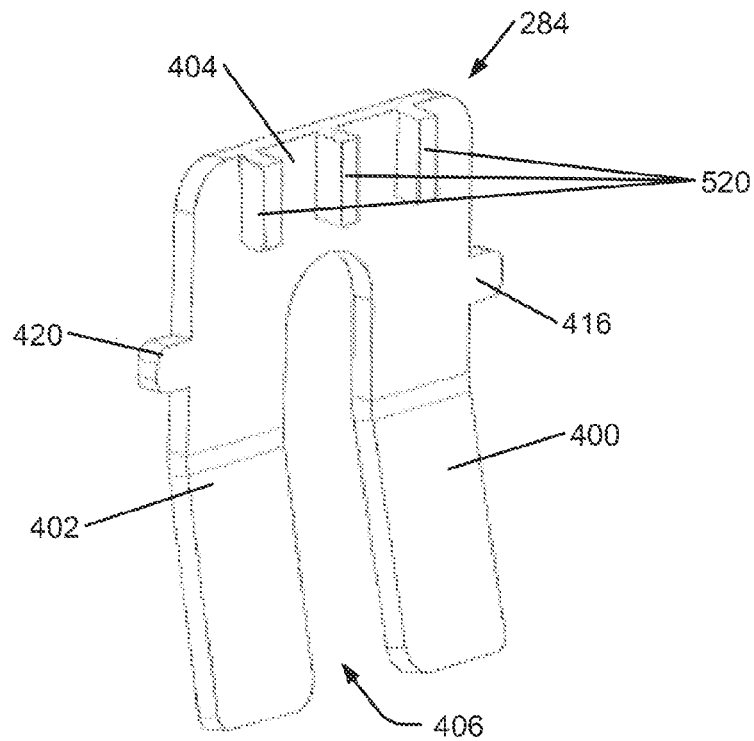
FIG. 10 is a perspective view of the heat shield of FIGS. 4-8 including fins to dissipate heat.

FIG. 10 is a perspective view of the heat shield 284 employing another heat dissipation structure. This heat dissipation structure includes a plurality of fins 520 to dissipate heat absorbed by the heat shield 284. In some embodiments, the fins 520 extend from the bridge 404 into the cavity 300 and, thus, toward the brake pads 242, 244. In other embodiments, the fins 520 may extend from other portions of the heat shield 284 and/or in other directions. In the illustrated embodiment, the fins 520 are rectangular prisms. However, the above-noted shape of the fins 520 is merely an example and, thus, other shapes may be employed in other embodiments. In some embodiments, the heat shield 284 employs one or more additional and/or alternative heat dissipating structures. For example, the heat shield 284 may include one or more of the fins 520 of FIG. 10, one or more of the apertures 518 of FIG. 9, and/or one or more additional and/or alternative suitable heat dissipating structures.

Figure 11:
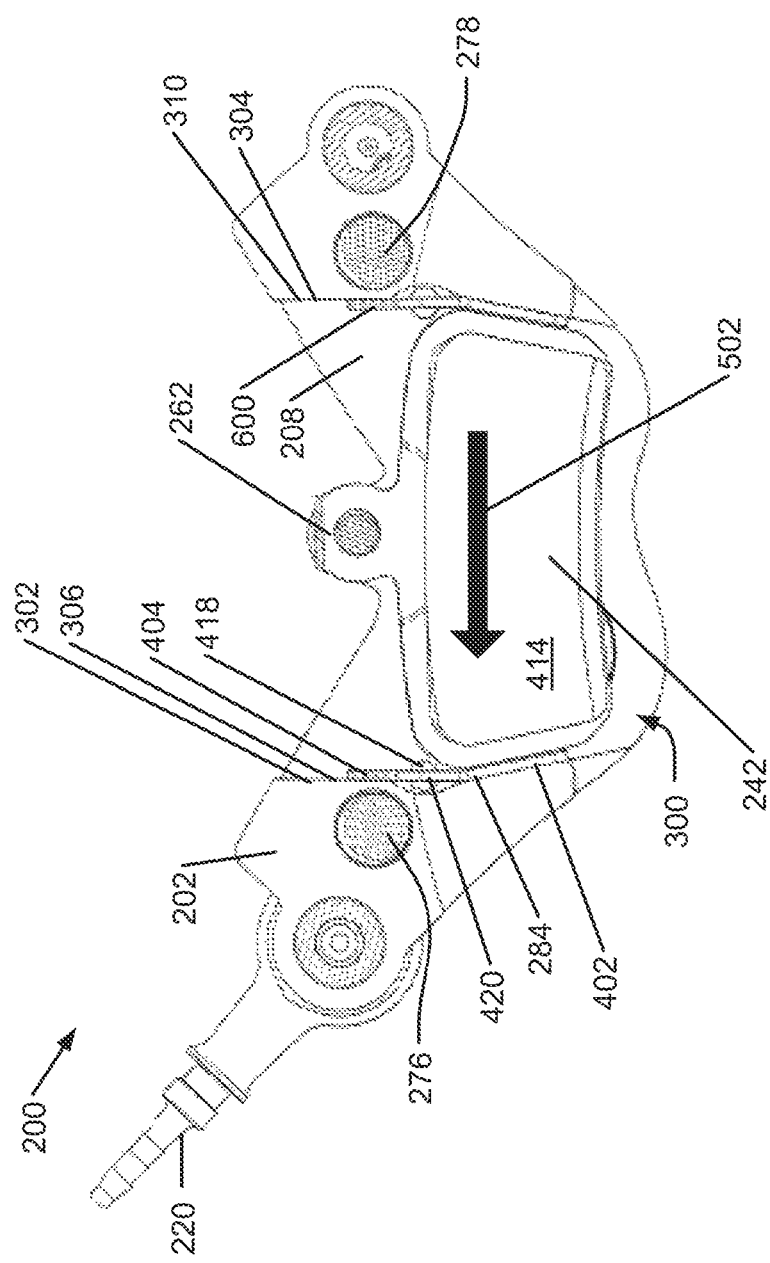
FIG. 11 is a side elevational view of the brake caliper of FIGS. 2-6 employing two heat shields in accordance with the teachings of this disclosure.

FIG. 11 is a side view of the caliper 200 of FIGS. 2-6. The second section 206 of the housing 202 is not shown for illustrative purposes. The caliper 200 of FIG. 11 includes a second heat shield 600 disposed between the brake pads 242, 244 and the second end wall 304 to reduce an amount of heat transferred to the housing 202 via the second end wall 304. The second heat shield 600 of FIG. 11 is a mirror image of the heat shield 284. Therefore, the above-description of the heat shield 284 is applicable to the second heat shield 600. The second heat shield 600 is oriented edgeways or sideways relative to the brake pads 242, 244, and the second heat shield 600 may be disposed on or in contact with the second end wall 304. In some embodiments, the second heat shield 600 is spaced apart from the first end wall 302. Thus, in the illustrated embodiment, the second heat shield 600 is fore of the brake pads 242, 244 relative to forward movement of a bicycle on which the caliper 200 of FIG. 11 is employed (e.g., the bicycle 100 of FIG. 1). The first brake pad 242 and the second brake pad 244 are both interposed between the heat shields 284, 600.

Figure 12:
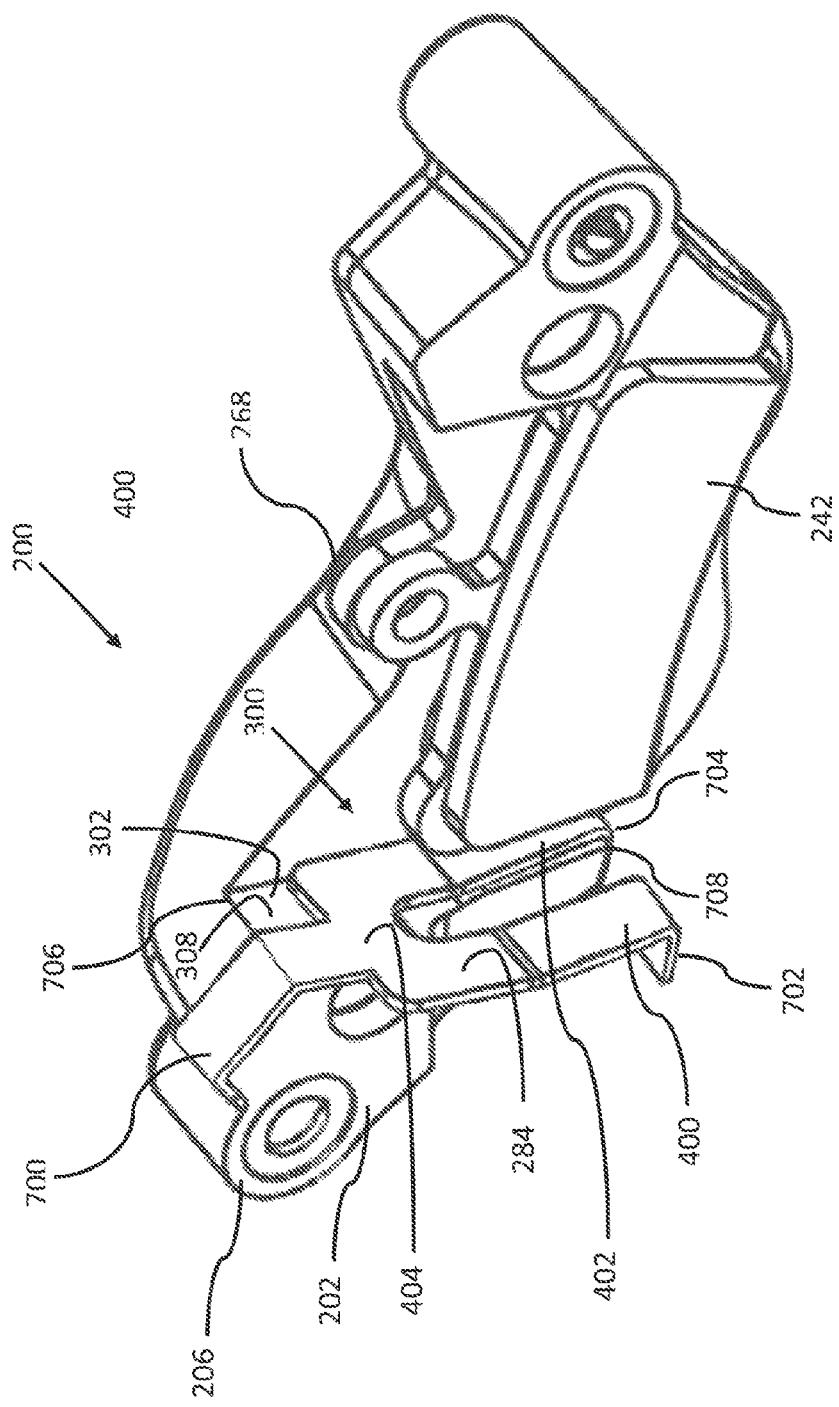
FIG. 12 is a perspective view of a heat shield including clips coupling the heat shield to the housing of the brake caliper of FIGS. 2-6.

FIG. 12 is a perspective view of the caliper 200 of FIGS. 2-6 and 11, which employs the heat shield 284 having a first clip 700, a second clip 702, and a third clip 704 to couple the heat shield 284 to the housing 202. The first section 204 of the housing 202 and the second brake pad 244 are not shown in FIG. 12 for illustrative purposes. In the illustrated embodiment, the first clip 700 extends from the bridge 404 and over and around an upper edge 706 of the first end wall 302. The second clip 702 extends from the first leg 400 and under and around a first lower edge (not shown) of the first portion 306 (FIG. 3) of the first end wall 302. The third clip 704 extends from the second leg 402 and extends under and around a second lower edge 708 of the second portion 308 of the first end wall 302. The first clip 700, the second clip 702, and the third clip 704 secure the heat shield 284 to the housing 202. Although the embodiment of FIG. 12 includes three clips (i.e., the first clip 700, the second clip 702, and the third clip 704), the heat shield 284 may include other numbers of clips in other embodiments and/or may include one or more clips configured in one or more additional and/or alternative ways.

In an embodiment, a heat shield for a brake caliper includes a first portion, a second portion spaced apart from the first portion, and a third portion extending between the first portion and the second portion, the heat shield configured to dispose the first portion and the second portion on opposing sides of a brake rotor. The heat shield may be configured such that the first portion is a first leg, the second portion is a second leg, and the third portion is a bridge connecting the first leg to the second leg so as to provide a space to straddle the brake rotor. The heat shield may also include a bridge extending between the first leg and the second leg. The heat shield may also include a heat dissipation structure, such as a fin and/or aperture. The heat dissipation feature may be disposed on the bridge. The heat shield may also include a first protrusion extending from the heat shield, the first protrusion dimensioned to be received in a receptacle. The heat shield may also include a second protrusion extending from the heat shield, the first protrusion and the second protrusion configured to support the heat shield on opposing sidewalls of the brake caliper. The heat shield may include an attachment mechanism to couple the heat shield to the brake caliper. The attachment mechanism may include a clip to couple the heat shield to the brake caliper.

In an embodiment, a brake caliper includes a housing having a cavity configured to receive a brake pad, and a heat shield disposed in the cavity, the heat shield including a slot to receive a portion of a brake rotor. The cavity may be defined by a first sidewall, a second sidewall opposite the first sidewall, and a first end wall extending between the first sidewall and the second sidewall. The brake caliper may include a piston disposed in the first sidewall and operatively coupled to the brake pad, and wherein the heat shield is disposed between an edge of the brake pad and the first end wall. The brake caliper may involve the positioning of the heat shield edgewise relative to the brake pad. The heat shield may be positioned fore or aft of the first brake pad relative to forward movement of a bicycle when the brake caliper is coupled to a bicycle. The heat shield may be coupled to a first sidewall of the housing and a second sidewall of the housing opposite the first sidewall. The heat shield may be a single piece. The heat shield may include a first protrusion received in a first receptacle of a first sidewall of the housing. The heat shield may include a second protrusion received in a second receptacle of a second sidewall of the housing opposite the first sidewall. The disposition of the heat shield in the cavity may be configured to place the heat shield in contact with the brake pad during engagement of brake pad with the brake rotor. The heat shield may include a bridge extending between the first leg and the second leg, the first leg and the second leg disposed on opposing sides of the slot.

In an embodiment, a brake caliper includes a cavity, a brake pad disposed in the cavity, the brake pad configured to apply braking force to a rotor, and a heat shield positioned in the cavity adjacent and forward of the brake pad in a direction of rotation of the brake rotor. The brake caliper may be configured such that an edge of the brake pad contacts a surface of the heat shield. The heat shield may include a first leg to be disposed on a first side of the brake rotor and a second leg to be disposed on a second side of the brake rotor. The brake pad may include a first surface to contact the brake rotor, the heat shield may include a second surface facing a center of the cavity, and the first surface is substantially orthogonal to the second surface. The brake caliper may also include a second heat shield, wherein the brake pad is interposed between the heat shield and the second heat shield. The heat shield may include a slot to receive a portion of the brake rotor. The brake caliper may be configured such that the brake pad is not in contact with the heat shield when in an un-engaged state, and is in contact with the heat shield in an engaged state. A heat shield may be positioned in the cavity forward of the first brake pad relative to forward movement of a bicycle to which the brake caliper is coupled. The brake caliper may also include a second brake pad, and wherein the heat shield contacts the brake pad and the second brake pad.

Numerous modifications to the embodiments disclosed herein will be apparent to those skilled in the art in view of the foregoing description. For example, any of the embodiments disclosed herein may be modified to include any of the structures or/or methodologies disclosed in connection with different embodiments. Accordingly, this disclosure is to be construed as illustrative only and is presented for the purpose of enabling those skilled in the art to make and use the invention and to teach the best mode of carrying out same. The exclusive rights to all modifications which come within the scope of the appended claims are reserved.

What is claimed is:

1. A heat shield for a brake caliper, comprising:
a first portion;
a second portion spaced apart from the first portion;
a third portion extending between the first portion and the second portion, the heat shield configured to dispose the first portion and the second portion on opposing sides of a brake rotor; and
a heat dissipation structure,
wherein the first portion is a first leg, the second portion is a second leg, and the third portion is a bridge connecting the first leg to the second leg so as to provide a space between the first leg and the second leg for the brake rotor to rotate therethrough.

2. The heat shield of claim 1, wherein the heat dissipation structure comprises a fin disposed on the bridge.

3. The heat shield of claim 1, wherein the heat dissipation structure comprises an aperture on the bridge.

4. The heat shield of claim 1 further comprising a first protrusion extending from the heat shield, the first protrusion dimensioned to be received in a receptacle.

5. The heat shield of claim 4 further comprising a second protrusion extending from the heat shield, the first protrusion and the second protrusion support the heat shield on opposing sidewalls of the brake caliper.

6. The heat shield of claim 1 further comprising an attachment mechanism to couple the heat shield to the brake caliper.

7. The heat shield of claim 6, wherein the attachment mechanism comprises a clip to couple the heat shield to the brake caliper.

* * * * *